United States Patent [19]

Koseki

[11] Patent Number: 4,703,487
[45] Date of Patent: Oct. 27, 1987

[54] DEVICE FOR SUPPRESSING ELECTRICAL DISCHARGES BETWEEN CATHODES OF LASER OSCILLATOR

[75] Inventor: Ryoji Koseki, Buena Park, Calif.

[73] Assignee: Amada Engineering & Service Co., Inc., La Mirada, Calif.

[21] Appl. No.: 765,103

[22] Filed: Aug. 13, 1985

[51] Int. Cl.$^4$ .............................................. H01S 3/00
[52] U.S. Cl. ......................................... 372/33; 372/97
[58] Field of Search ...................... 372/33, 34, 61, 65, 372/97

[56] References Cited

U.S. PATENT DOCUMENTS 4,610,014  9/1986  Martinen et al. ...................... 372/55

Primary Examiner—Gene Wan
Attorney, Agent, or Firm—Wigman & Cohen

[57] ABSTRACT

A gas oscillator consisting of a plurality of laser tubes with discharge electrodes arranged in a straight line so that the cathodes are next to each other, a gas drive, a heat exchanger to cool a laser gas and an exhaust device provided to expel the laser gas from the laser tubes and containing an injection device for non-ionized gas to separate and expel the ionized gas from the laser tubes so as to suppress electrical discharges between the cathodes of the laser oscillator.

10 Claims, 4 Drawing Figures

DEVICE FOR SUPPRESSING ELECTRICAL DISCHARGES BETWEEN CATHODES OF LASER OSCILLATOR

TECHNICAL FIELD OF THE INVENTION

This invention relates to a gas laser oscillator. More specifically, it relates to a device for suppressing electrical discharges between neighboring electrodes in such a gas laser oscillator.

RELATED ART

High-speed axial flow gas laser oscillators, such as a carbon dioxide gas laser oscillator 1 shown in FIG. 1 and FIG. 2, have previously been developed. This carbon dioxide gas laser oscillator 1 is comprised of a support frame 3, a laser oscillating section 5 which is supported by the support frame 3, and an adjustment attachment 7 which adjusts the laser oscillator 5.

The support frame 3 has left and right support posts 9A and 9B. Disposed in the middle of the oscillator 1 is a main heat exchanger 11 which cools a laser gas essentially consisting of a mixture of carbon dioxide, nitrogen and helium. Disposed on the top surface of the heat exchanger 11 is a gas circulation drive device 13 to circulate the laser gas with an auxiliary heat exchanger 15 being disposed above the drive device 13 to cool the laser gas further.

The laser oscillating section 5 comprises two laser tubes 19A and 19B, which are supported by support plates 17A and 17B, which in turn are supported on the top surfaces of the support posts 9A and 9B so that they are free to move slightly to the left and right. The support plates 17A and 17B are solidly coupled by four tie rods 21. In addition, the two laser tubes 19A and 19B comprises two center tubes 23 and two end tubes 25, respectively, which are supported by five holder plates 27 which are attached to the tie rods 21. It will be noted that the center and end tubes 23 and 25 are lined up in a straight line.

Each laser tube 19A and 19B has four laser gas inflow sections 29 for laser gas supplied from the auxiliary heat exchanger 15, and two exhaust sections 31 for expulsion of hot laser gas. The laser gas expelled from the exhaust sections 31 passes through a gas return path 33 and is de-ionized by a catalyst in an expanded section 35. After being cooled in the main heat exchanger 11, the gas circulation drive device 13 drives the gas through the auxiliary heat exchanger 15, from where it is again supplied to the laser tubes 19A and 19B.

There are anodes 37 for discharge on the opposite sides of the gas inflow sections 29, and cathodes 39 on the opposite sides of each of the gas exhaust sections 31, in the laser tubes 19A and 19B. It will be noted that the cathodes 39 are positioned close to each other. Electrical discharges between the two electrodes excite the laser gas. The light produced travels back and forth between a rear mirror 41, a bend mirror 43 and an ouput mirror 45. The amplification produces the laser oscillations. Part of the light produced is reflected to the outside by the output mirror 45 and is used for laser processing. In this laser oscillator, the longer the laser tube and the cooler the laser gas, the larger the laser output.

The above is an outline of the construction and operation of a previously developed carbon dioxide gas laser oscillator. The present invention is directed to the laser gas exhaust section 31 of such a carbon dioxide gas laser oscillator.

The left half of the oscillating section 5 in FIG. 1, discussed above, is shown in more detail in FIG. 3. That is to say, there are four laser tube sets, left, right, front and rear, each consisting of a center tube 23, an end tube 25 and a gas return path 33. As shown in the figure, the laser gas flows through the path shown by the arrows, from an auxiliary heat exchanger 15 through the center and end tubes 23 and 25, then through the gas return path 33 in the middle, back to the main heat exchanger. The anodes 37 in the center tube 23 and the end tube 25 are grounded, while the cathodes 39 are connected through the stable resistors $R_1$ and $R_2$ to the cathode sides of the independently variable DC power supplies $E_1$ and $E_2$ respectively. The anode sides of the power supplies are grounded.

Normally, electrical discharges take place between the anodes 37 and the cathodes 39, but if there is a difference between the electrical resistances of the laser gas flowing through the left and right tubes, an electrical potential difference arises between the electrodes. In the region A between the electrodes where the laser gases from the left and right tubes merge, the laser gas is strongly ionized, and its electrical resistance is low.

Consequently, when a sufficient electric potential difference arises between the two cathodes close to each other, an electrical discharge occurs between them. When such an electrical discharge occurs, the main discharges become unstable, and the laser output drops.

Accordingly, a primary object of the present invention is to provide a laser oscillator the main discharges of which are stable.

Another object of the present invention is to provide a laser oscillator wherein even if an electrical potential difference arises between the two cathodes of a laser oscillator, electrical discharges between electrodes are suppressed so as not to produce any electrical discharge between the cathodes.

Another object of the present invention is to provide a laser oscillation wherein the problems caused by an electrical discharge between the cathodes, such as reduced laser output and inefficient use of electrical power input, are prevented.

This and other objects and features of the invention will become apparent by reference to the following detailed description of preferred embodiments when considered in conjunction with the accompanying drawing.

SUMMARY OF THE INVENTION

In order to solve the problems as mentioned above, there is an exhaust section provided between the cathodes of neighboring tubes lined up in a straight line to expel the laser gas from between the cathodes. The exhaust section contains a non-ionized gas injection device to separate and expel the ionized gas flowing from the laser tubes.

DETAILED DESCRIPTION OF A PREFERRED EMBODIMENT

Figure 1:
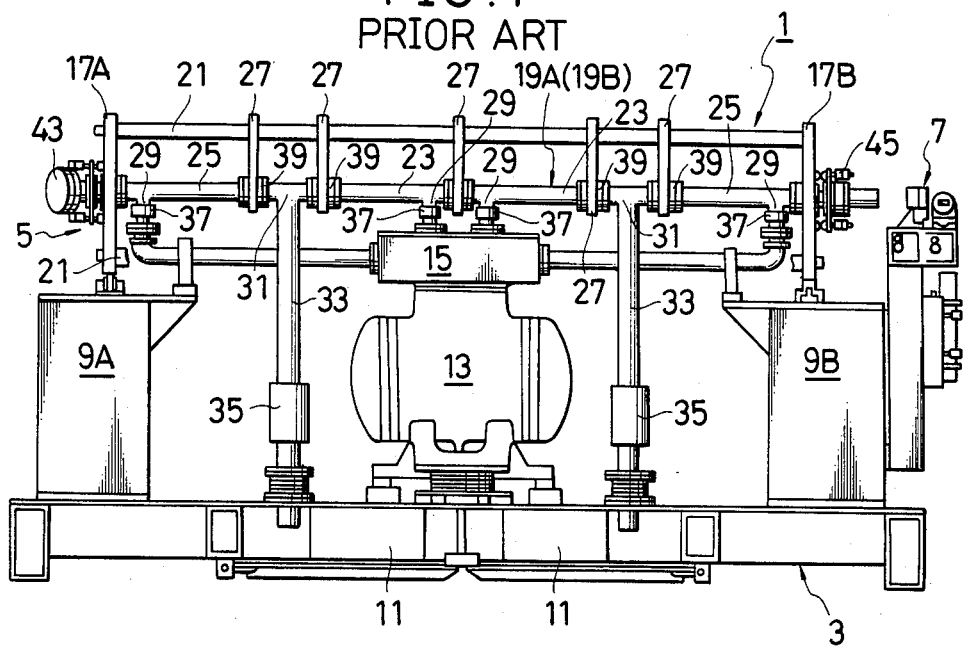
FIG. 1 is a front elevational view of a carbon dioxide gas laser oscillator in the prior art.
Figure 2:
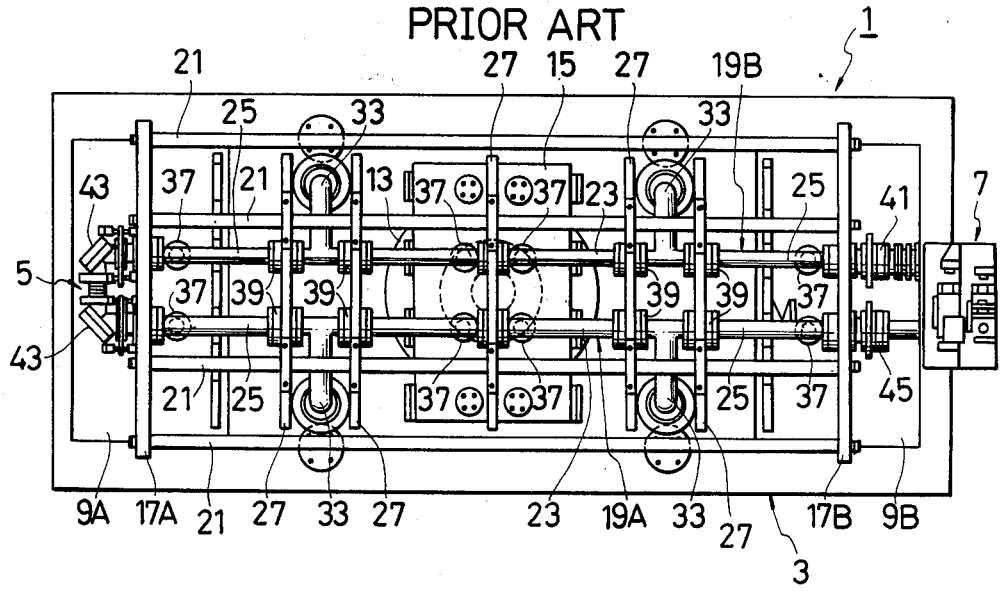
FIG. 2 is a side elevational view of the carbon dioxide gas laser oscillator in FIG. 1.
Figure 3:
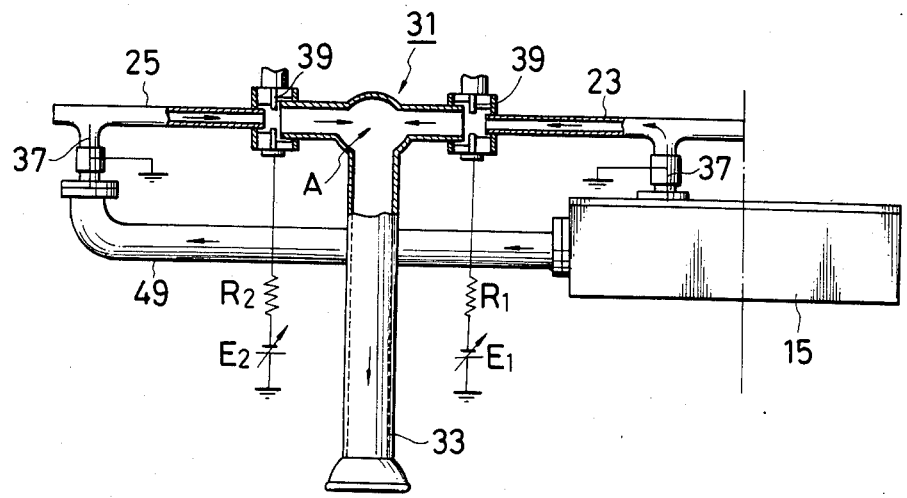
FIG. 3 is a schematic view of a laser gas exhaust section of the carbon dioxide gas laser oscillator of FIG. 1.
Figure 4:
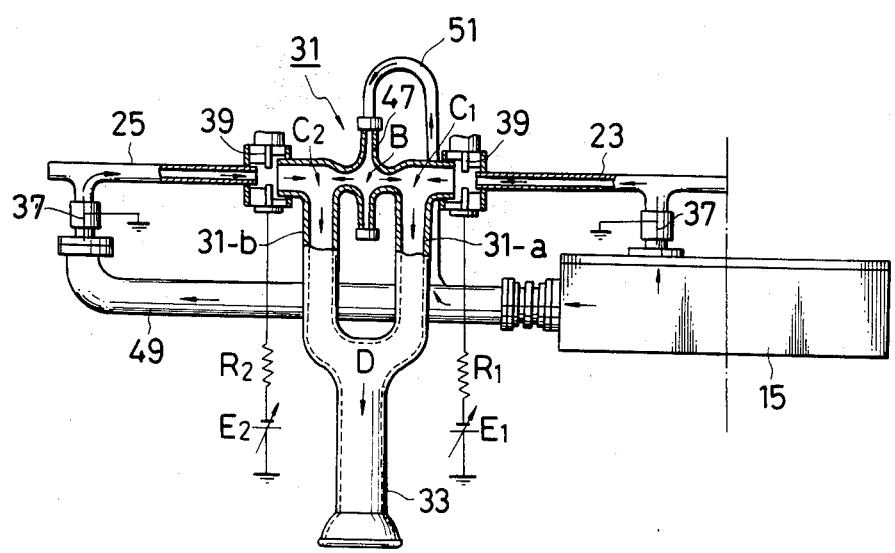
FIG. 4 is a schematic view of a laser gas exhaust section incorporating one embodiment of this invention.

Now, an embodiment of this invention will be explained with reference to the drawings. FIG. 4, wherein like numerals are used to indicate like members as in the previous figures, shows an embodiment of this invention in a carbon dioxide gas laser oscillator, analogous to the previously developed gas laser oscillator shown in FIG. 3 except for the exhaust section. That is to say, the laser gas exhaust section 31 has been changed from the T shape in FIG. 3 to a Y shape so as to have two exhaust paths 31a and 31b. Disposed between the paths 31a and 31b is a non-ionized laser gas injection section 47, to which fresh laser gas is supplied by the injection tube 51, which branches from the middle of the connecting tube 49 which supplies cooled non-ionized laser gas from the auxiliary heat exchanger 15 to the end tube 25.

This non-ionized laser gas splits in region B, some traveling to the left and some to the right, where it mixes with the ionized gas from the left and right laser tubes in the regions $C_1$ and $C_2$ respectively; it then passes through the exhaust paths 31a and 31b, the two streams merging in region D. The gas then passes through a gas return path 33 back to the main heat exchanger. Since the gas in region B is not ionized, the electrical resistance is high. In addition, the influx of fresh gas lowers the degree of ionization of the gas in region D. Also, since the distance between the two electrodes is long, even if a certain electrical potential difference arises between the two cathodes, no electrical discharge occurs. Consequently, the laser oscillator operates stably.

In operation, ionized laser gas passing by the cathodes 39 in the center tube 23 and the end tube 25 in the direction shown by the arrows is separated by non-ionized laser gas in the region B between the regions $C_1$ and $C_2$ and then flows downward through the exhaust paths 31a and 31b in the direction of the arrows. After the degree of ionization has been reduced, the two streams merge in region D. Consequently the electrical resistance between the two cathodes is higher than in the previously developed laser oscillator because of the presence of the non-ionized laser gas in region B. In addition, even after the streams merge in region D, the distance between the electrodes is long and the degree of ionization has been reduced, so the electrical resistance in this circuit is also high. Consequently, even if a certain electrical potential arises between neighboring cathodes, no electrical discharge occurs between the cathodes. The non-ionized laser gas in region B is supplied to the laser tubes from the auxiliary heat exchanger 15 through the connecting tube 49, the injection tube 51 and the injection section 47.

Although a preferred form of the present invention has been illustrated and described, it sould be understood that the device is capable of modification by one skilled in the art without departing from the principles of the invention. Accordingly, the scope of the invention is to be limited only by the claims appended hereto.

What is claimed is:

1. A gas laser oscillator comprising:
    a plurality of laser tubes which are disposed in a straight line in a manner such that a plurality of cathodes are arranged adjacent one another to form a gap between said cathodes, said laser tubes communicating with each other at abutted ends of said laser tubes;
    means for supplying a laser gas into said laser tubes, said gas supply means having a heat exchanger to cool the laser gas;
    means for exhausting the laser gas from said laser tubes, said exhausting means provided near the cathodes;
    means connected to said gap for injecting non-ionized gas directly into the gap between the adjacent cathodes.

2. The gas laser oscillator as described in claim 1, wherein said exhausting means comprises a Y-shaped exhaust section having two exhaust paths and a merging portion, each of said two exhaust paths connected at the end opposite to said merging portion to each said laser tube, said merging portion connected to a gas return path to said heat exchanger, and said injection means connected to said Y-shaped exhaust section so as to inject the non-ionized gas into a portion of the laser tubes between the connection of the two exhaust paths to the laser tubes.

3. The gas laser oscillator as described in claim 2, wherein said non-ionized gas is introduced to said injection device from said gas supplying means.

4. The gas laser oscillator as described in claim 2, wherein said non-ionized gas is introduced to said injection device from said gas supplying means.

5. The gas laser oscillator as described in claim 2, wherein said path is sufficiently long to suppress any discharge in said merging portion.

6. A gas laser oscillator, comprising:
    a laser tube having discharge electrodes arranged therealong in a straight line with two cathodes arranged adjacent one another and forming a gap therebetween;
    an exhaust device mounted in the tube; and
    means for injecting non-ionized laser gas directly into the gap between the cathodes to suppress electrical discharges between the cathodes.

7. The oscillator according to claim 6, wherein the exhaust device is arranged between the cathodes.

8. The oscillator according to claim 6, wherein the exhaust device comprises a separate exhaust passage arranged adjacent each cathode.

9. The oscillator according to claim 8, wherein the separate passages are connected at one end to form a common exhaust passage and are connected at the other end by a third passage.

10. The oscillator according to claim 9, wherein the non-ionized gas is injected into the third passage for delivery to the separate exhaust passages.

* * * * *

UNITED STATES PATENT AND TRADEMARK OFFICE
CERTIFICATE OF CORRECTION

PATENT NO. : 4,703,487
DATED : October 27, 1987
INVENTOR(S) : RYOJI KOSEKI

It is certified that error appears in the above-identified patent and that said Letters Patent is hereby corrected as shown below:

IN THE CLAIMS:

Claim 3, line 1, "claim 2" should be --claim 1--.

Signed and Sealed this

Twelfth Day of April, 1988

Attest:

DONALD J. QUIGG

Attesting Officer

Commissioner of Patents and Trademarks